United States Patent
Keilbach et al.

[15] 3,691,769
[45] Sept. 19, 1972

[54] MULTI-COMPONENT PROPELLANT JET PROPULSION

[72] Inventors: Joseph R. Keilbach, Glastonbury, Conn.; Vito J. Sarli, Wapping, Conn.

[73] Assignee: United Aircraft Corporation, East Hartford, Conn.

[22] Filed: Jan. 16, 1964

[21] Appl. No.: 338,259

[52] U.S. Cl. ............................60/217, 60/211, 60/219, 60/220, 149/1, 149/2, 149/7, 149/22, 149/74
[51] Int. Cl. ............................C06d 5/08, C06d 5/10
[58] Field of Search......60/35.4, 35.6, 221, 214–217, 60/219, 220; 149/1, 74, 2, 7, 22

[56] References Cited

UNITED STATES PATENTS

| | | | |
|---|---|---|---|
| 3,116,187 | 12/1963 | Scanlon et al. | 149/36 X |
| 3,133,841 | 5/1964 | Kuehl | 149/5 |
| 3,153,902 | 11/1964 | Morrell | 60/35.4 |
| 3,197,348 | 7/1965 | Skolnik et al. | 149/1 X |
| 3,112,609 | 12/1963 | Bridgforth | 60/35.4 |
| 3,153,903 | 10/1964 | Morrell | 60/35.4 |
| 3,158,997 | 12/1964 | Blackman et al. | 60/35.6 |
| 3,161,017 | 12/1964 | Holmes | 60/35.6 |

Primary Examiner—Benjamin R. Padgett
Attorney—Morgan, Finnegan, Durham & Pine

EXEMPLARY CLAIM

In the method of supplying a multi-component propellant including metal, oxidizer and hydrogen to the combustion chamber of a multi-component propellant rocket motor, the improvement which comprises stably suspending finely divided hollow particles of the metal in a liquid oxidizer to form a suspension of hollow particles of the metal in the liquid oxidizer, the hollow particles of said metal having a specific gravity approximately equal to the specific gravity of the liquid oxidizer; such that such suspension is stable and capable of withstanding the gravitational fields and acceleration forces to which the rocket engine system is subjected.

17 Claims, 4 Drawing Figures

MULTI-COMPONENT PROPELLANT JET PROPULSION

This invention relates to jet engine propulsion and more particularly to improved multi-component propellant systems useful in connection therewith.

An object of this invention is to provide improved multi-component propellant systems comprising a metal fuel, oxidizer and hydrogen.

Another object of the invention is to provide improved systems for injecting metal into multi-component propellant rocket motors.

A further object of the invention is to provide practicable multi-component propellant systems comprising a metal, oxidizer and hydrogen having high performance capabilities.

Other objects of the invention will in part be obvious and will in part appear hereinafter.

It is well known that multi-component propellant systems comprising metal, oxidizer and hydrogen (e.g., metal/$O_2$/$H_2$) have highly attractive theoretical specific impulse and payload capability.

The attainment of high delivered specific impulse from such propellant systems has been impeded, however, by problems associated with the transport and injection of the metal particles into practical multi-component propellant rocket motors.

Because of the complexities and propellant flow rate fluctuations which are characteristic of mechanical and/or gas fluidized powder-feed systems, the most feasible approach to the solution of the problems of metal transport and injection heretofore proposed includes the use of a fourth propellant as a vehicle for the powdered metal. This approach accepts the reduction in performance capability which always results from the adulteration of multi-component propellant systems with the carrier material.

According to this invention, it has been discovered that reduction in performance capability resulting from the adulteration of the multi-component propellant system with a carrier for the metal can be substantially reduced if not eliminated by using liquid oxidizers as carriers for the metal in such a way as to produce stable slurries of the metals having good rheological properties.

The term "metal" as used herein includes a metal, mixture of metals, metal alloys, mixture of metal alloys, or mixtures of any of the foregoing.

The multi-component propellant systems disclosed herein employ a stable slurry of finely divided metal particles suspended in a liquid oxidizer. The slurries are stabilized so as to ensure continued suspension of the metal particles in the liquid oxidizer under the high gravitational fields and/or high acceleration forces to which the fuel system is ordinarily subjected in operation. The systems disclosed herein have been discovered to have ultra-high specific impulses and high system performance, among other advantages which will be more specifically enumerated hereinbelow.

Among the liquid oxidizers which may be used in the metal slurries may be mentioned hydrogen peroxide ($H_2O_2$), nitrogen tetroxide ($N_2O_4$), and liquid oxygen ($O_2$) itself.

Typical of the metals which may be used in the basic tripropellant system under discussion are beryllium and aluminum. The system Be/$O_2$/$H_2$ has especially high theoretical specific impulse and payload capability, and is particularly suitable for practicing the invention described herein.

Although the invention will be described with particular reference to the Be/$O_2$/$H_2$ system, it should be understood that the principles described are applicable to the multi-component propellant system: metal/oxidizer/hydrogen generally.

The nature of the invention will be made more clear by reference to the accompanying drawings, wherein.

As described hereinabove, the oxidizer slurry is comprised of finely divided metallic particles stably suspended in a liquid oxidizer such as hydrogen peroxide, nitrogen tetroxide, or oxygen.

Figure 1:
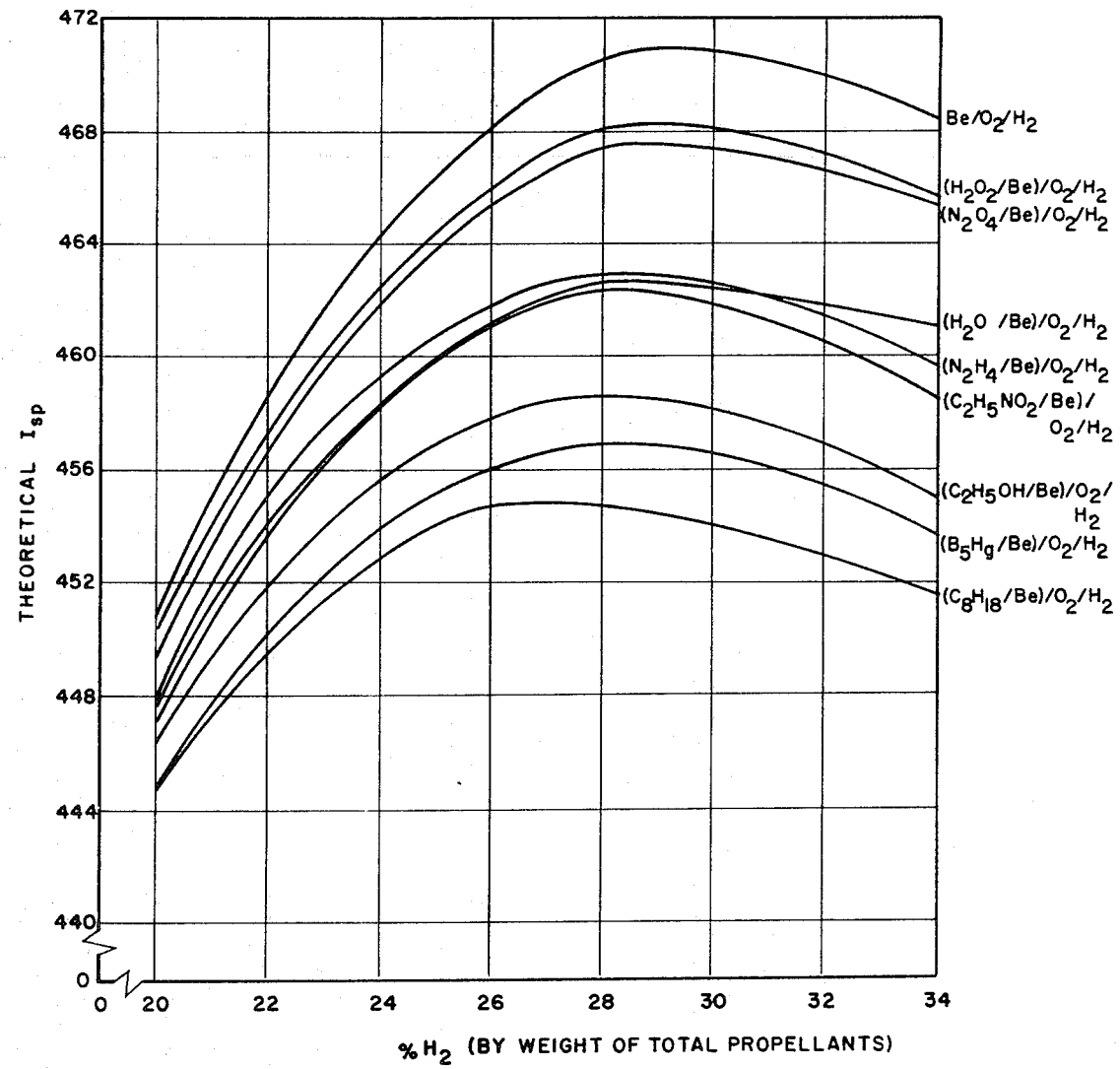
FIG. 1 is a graph showing the effect on theoretical specific impulse of the carrier used to transport the metal.

The superiority in performance obtained by the use of the liquid oxidizers described rather than conventional fuels, as carriers for the metal, is clearly shown in FIG. 1, which is a graph of theoretical specific impulse (Isp) as a function of weight per cent hydrogen (based upon the total weight of the propellants) for the propellant system Be/$O_2$/$H_2$, wherein different carriers are used for the metal. As is clear from FIG. 1, the systems disclosed herein in which liquid oxygen, $H_2O_2$ or $N_2O_4$ is used as the carrier for the metal have a much higher specific impulse than the systems in which fuels such as $H_2O$, $N_2H_4$, $C_2H_5NO_2$, $C_2H_5OH$, $B_5H_9$, and $C_8H_{18}$ are used as the carrier for the metal.

In FIG. 1, the calculations are for a combustion chamber pressure, $P_c$, of 1,000 psia, and a nozzle exit pressure, $P_e$, of 14.7 psia. For all curves except the Be/$O_2$/$H_2$ system, the metal-carrier admixture comprises 85 weight percent beryllium.

For all curves in FIG. 1, the amount of total oxygen is that required to react in approximately stoichiometric proportions with the beryllium and carbon where carbon is present in the carrier).

For all curves in FIG. 1, the amount of beryllium ranges from about 25 to 26 percent, based on the total weight of propellants.

Figure 2:
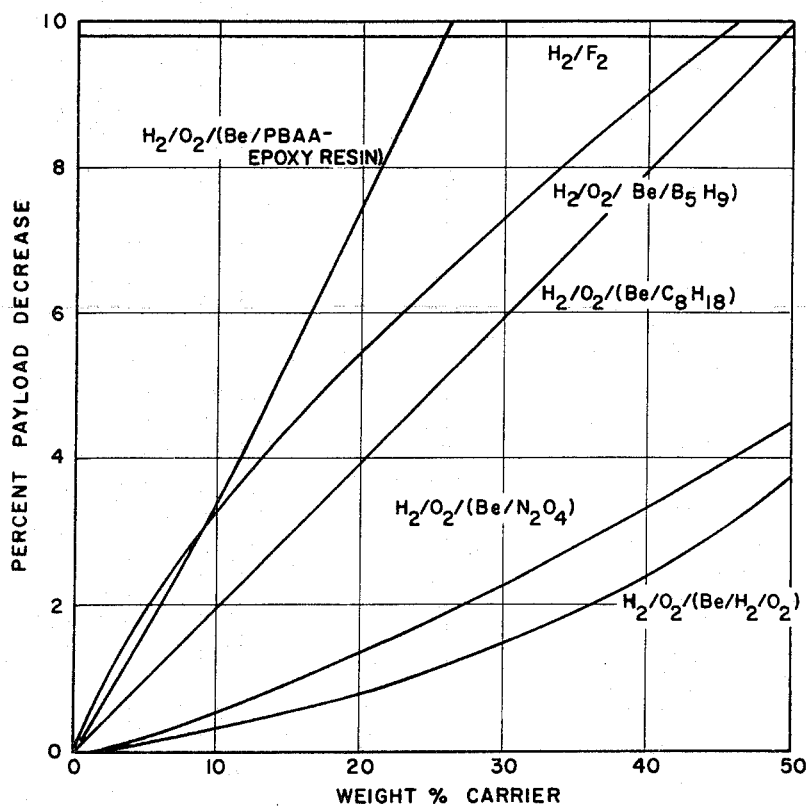
FIG. 2 is a graph showing the effect on payload capacity of the carrier used to transport the metal.

FIG. 2 is a plot of percent payload decrease as a function of the amount of metal carrier employed. As is clear from FIG. 2, the use of the liquid oxidizer carrier system taught herein does not lead to excessive performance penalties, in spite of the fact that relatively high weight percentages of the liquid oxidizer carrier are required for suitable rheological properties.

As is shown by FIG. 2, use of the liquid-oxidizer carrier of this invention in amounts up to 50 percent by weight leads to a theoretical per cent payload decrease of only about 4 per cent. See the curves (FIG. 2) marked $H_2$/$O_2$/ (Be/$N_2O_4$) and $H_2$/$O_2$/ (Be/$H_2O_2$).

The calculations for the curves of FIG. 2 are for the following mission:

| | |
|---|---|
| First Stage | : Titan I |
| Second Stage Gross Weight | : 60,850 lb. |
| Orbital Altitude | 200 mi. |

The "PBAA-Epoxy Resin" mentioned in FIG. 2 is a binder composition comprising 98 weight percent polybutadiene acrylic acid and 2 percent of an epoxy resin curing agent for the polybutadiene acrylic acid.

In the propellant systems disclosed herein, the amount of total oxygen (both fuel and carrier) will be substantially equal to the amount required to stoichiometrically react with the metal. The amount of hydrogen will be that amount required to yield maximum impulse. In general, the amount of hydrogen will vary between about 20 and 34 percent by weight of the total fuel system, and usually between about 26 and 30 percent by weight of the total fuel system.

Figure 3:
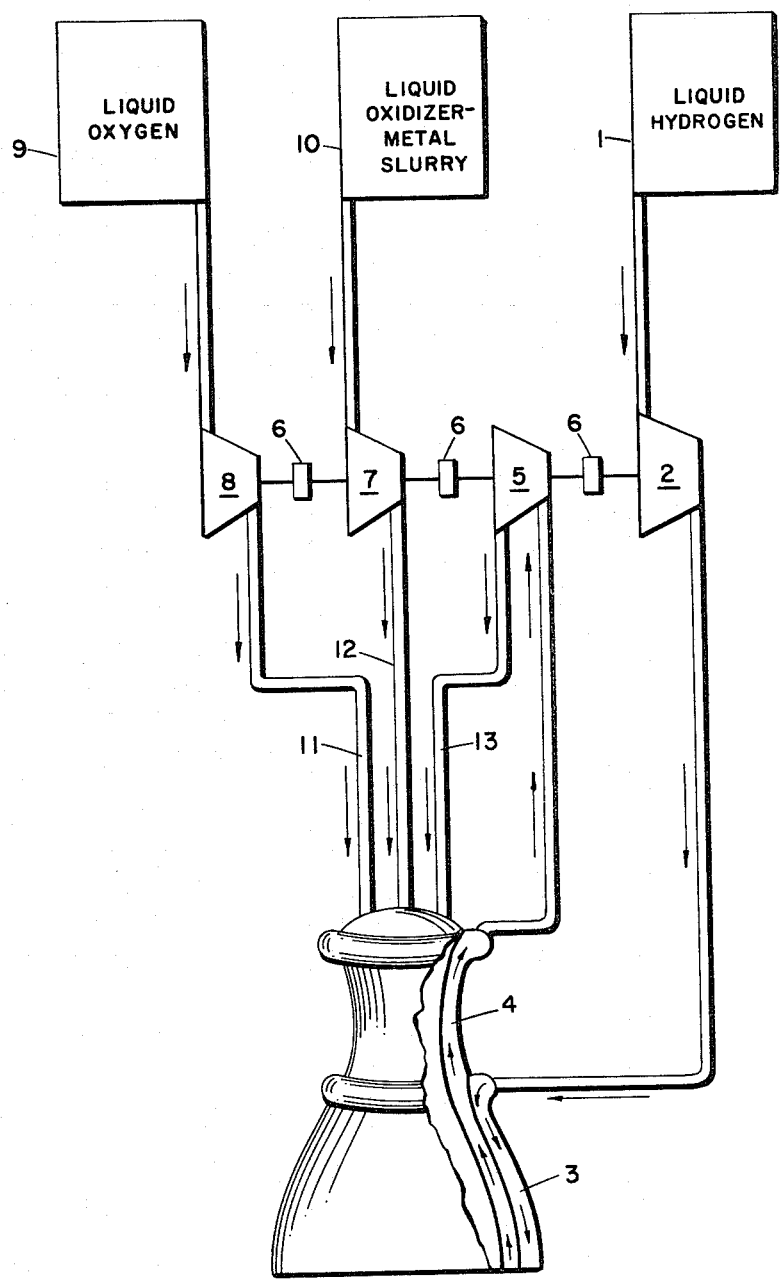
FIG. 3 is a schematic diagram of the multi-component propellant rocket motor system of the present invention.

FIG. 3 illustrates schematically a rocket engine system utilizing a liquid oxidizer as a means for transporting and injecting metal particles into the tripropellant thrust chamber.

In FIG. 3, liquid hydrogen is stored in tank 1. Pump 2 forces the hydrogen in the liquid phase through regenerative cooling passages, to cool the exhaust nozzle 3 and, if necessary, parts of the combustion chamber 4 of a rocket motor. The hydrogen vaporizes and passes into a turbine 5 which supplies power through suitable gear boxes 6 to the hydrogen pump 2, the slurry pump 7 and the oxygen pump 8. Liquid oxygen is stored in tank 9 and the slurry in tank 10. The oxygen passes through line 11 and is injected through suitable injectors into combustion chamber 4. The slurry and the hydrogen are injected into the combustion chamber through lines 12 and 13, respectively. If the oxygen is utilized as the carrier fluid for the slurry, items 8, 9, and 11 may be deleted from the system.

To provide suitable storeability and pumping characteristics for the metal-liquid oxidizer slurries, it is necessary that the slurries be stabilized to guard against the tendency of the metal particles to separate from the liquid oxidizer carriers in gravitational fields or under conditions of high acceleration.

It has been discovered that this problem of phase separation may be solved by addition to the slurry of a small quantity (i.e., less than about 2-4 percent by weight) of a material which promotes the formation of a gel structure in the liquid oxidizer, thereby causing retention of the solid particles in suspension. Typical of such gellants is finely divided aluminum oxide, which, when added in an amount of about 1 percent by weight to metal slurries of $N_2O_4$, gels the slurries, thereby insuring retention of the metal particles in suspension.

Alternatively, to prevent phase separation in the slurry, the density of the metal particles may be altered to conform to that of the oxidizer-carrier portion of the slurry. For example, hollow metal particles of a controlled specific gravity substantially equal to that of the oxidizer may be employed.

Techniques for fabricating such hollow metal particles are described in co-pending application Ser. No. 818,061, filed June 4, 1959. In general, such techniques comprise establishing a spherical core, forming a thin metal layer of controlled thickness over the core, as by electrodeposition, electroless metal deposition, vapor deposition, immersion, and so forth. The core is then removed, to leave a hollow sphere of the desired metal. An opening in the metal coating is generally provided to provide for ready removal of the core material, and in many instances, the core is itself perforated. For the present invention, it would then be necessary to seal the perforation in the metal sphere as, for example, by another coating of metal.

Figure 4:
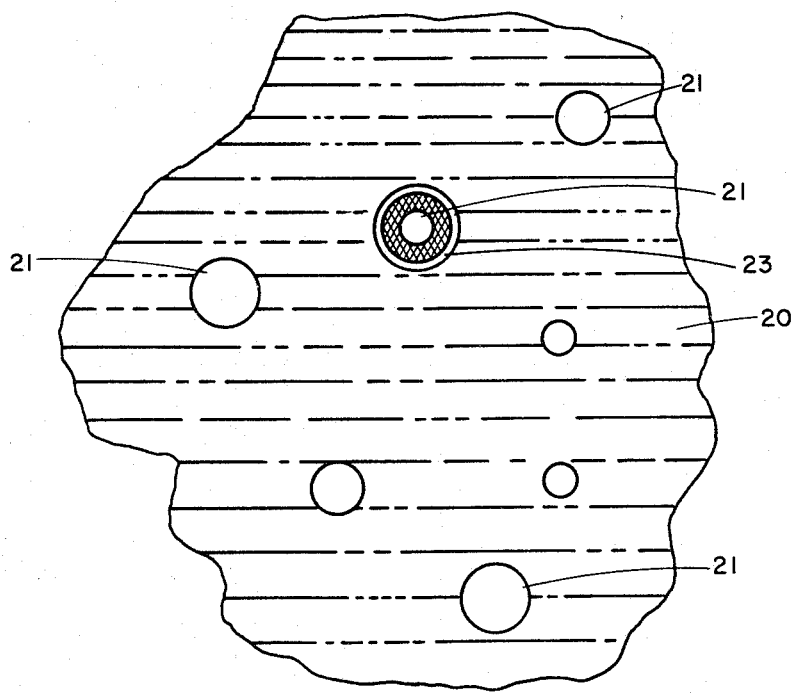
FIG. 4 is a schematic diagram of one embodiment of the metal-oxidizer slurry of the present invention.

A schematic diagram of a slurry formed from such specific gravity regulated spheres is shown in FIG. 4, wherein hollow metal spheres 21 are suspended in the liquid oxidizer 20 by virtue of the similarity between the phase densities of the spheres and the oxidizers.

The controlled specific gravity approach is especially attractive when oxygen is used as the carrier, but could also be used with other liquid oxidizers to avoid the necessity for the use of gellants.

Depending upon the metal of the system, care may have to be taken in preparing the slurries to avoid premature reaction.

When the metal particles of the system readily form a stable oxide, e.g., aluminum, no special precautions may be necessary since the inert aluminum oxide film which forms at the surface of the aluminum particles effectively prevents premature reaction between the aluminum particles and the oxidizer.

When the metal is highly reactive, e.g., beryllium, the particles should be encapsulated, or coated with a thin layer of a material stable and substantially inert to oxygen at ordinary conditions, but readily volatizable, decomposable or otherwise capable of dissipating at the combustion temperature of the propellant system, thereby permitting ready access of the metal to the combustion process, when ignition temperature is reached. Suitable coating materials include waxes, plastics and resins such as Kel-F or Teflon, low boiling metals and metal alloys, and the like.

Such a film is shown at 23 in FIG. 4.

For beryllium, particularly suitable encapsulating films include polytetrafluoroethylene polymers and copolymers (Teflon), polymers and copolymers of trifluorochloroethylene (Kel-F) and aluminum.

The metal particles of the oxidizer-slurries will generally have an average particle size of less than about 250 microns and generally less than 100 microns. Small metallic particles of average size less than 10 microns, e.g., 0.001 to 10 microns, may be employed if the small particles are dispersed in an inert matrix, as described for example in copending application Ser. No. 146,165, filed Oct. 19, 1961. In this embodiment, the matrix containing the small metal particles could be made hollow to regulate specific gravity for the purpose described hereinabove.

The present invention provides a simple, reliable system for burning small metal particles in combination with hydrogen and suitable oxidizers to achieve ultra-high specific impulses.

The fuel systems described retain the desirable restart, throttleability, and mixture ratio control capabilities normally associated with conventional liquid propellant systems.

Ease of ignition and high metal-combustion efficiency are promoted through the simultaneous injection of the metal with the oxidizer and there is maintained freedom to distribute the hydrogen injection so that oxidizer concentrations favorable to the metal combustion process are maintained in the metal combustion zone.

The use of slurries of oxidizer carriers and metal promotes the maintenance of good propellant pumping properties without excessive loss of system performance.

The oxidizer/metal slurry concept described herein is readily adaptable to the "boot straps" propellant pumping cycle described in U.S. Pat. No. 3,077,073, and also to other existing $H_2/O_2$ rocket engine systems.

A further advantage in the case of the $H_2O_2$ and $N_2O_4$ oxidizers is that propellant storability is enhanced.

The invention in its broader aspects is not limited to the specific steps, methods, compositions, combinations, mechanisms and improvements described, but departures may be made therefrom within the scope of the accompanying claims without departing from the principles of the invention and without sacrificing its chief advantages.

What is claimed:

1. In the method of supplying a multi-component propellant including metal, oxidizer and hydrogen to the combustion chamber of a multi-component propellant rocket motor, the improvement which comprises stably suspending finely divided particles of metal in a liquid oxidizer to form a slurry capable of retaining the metal particles in suspension under the gravitational fields and acceleration forces to which the rocket engine system is subjected, said particles of metal being provided with a coating which is inert to the liquid oxidizer and feeding the resulting metal-liquid oxidizer slurry to the combustion chamber.

2. The improvement of claim 1 wherein the liquid oxidizer of the slurry is a member selected from the group consisting of liquid oxygen, nitrogen tetroxide and hydrogen peroxide.

3. The improvement of claim 1 wherein the liquid oxidizer of the slurry is liquid oxygen, and wherein the metal-liquid oxygen slurry and hydrogen are fed to the combustion chamber separately.

4. The improvement of claim 1 wherein the liquid oxidizer of the slurry is a member selected from the group consisting of nitrogen tetroxide, and hydrogen peroxide, and wherein the liquid oxidizer, the slurry, and liquid hydrogen are separately fed to the combustion chamber.

5. The improvement of claim 1 wherein the slurry comprises a small amount of a material capable of gelling the liquid oxidizer, said material serving to maintain the finely divided particles of the metal fuel suspended in the oxidizer.

6. The improvement of claim 1 wherein the liquid oxidizer of the slurry is liquid nitrogen tetroxide, and wherein the slurry comprises a small amount of finely divided aluminum oxide, the aluminum oxide serving to gel the liquid nitrogen tetroxide to thereby maintain the finely divided particles of the metal fuel suspended in the liquid nitrogen tetroxide.

7. The improvement of claim 1 wherein the particles of metal fuel suspended in the liquid oxidizer have a specific gravity approximately equal to the specific gravity of the liquid oxidizer, thereby insuring stability of suspension of the metal particles in the liquid oxidizer.

8. In the method of supplying a multi-component propellant including metal, oxidizer and hydrogen to the combustion chamber of a multi-component propellant rocket motor, the improvement which comprises stably suspending finely divided hollow particles of the metal in a liquid oxidizer to form a suspension of hollow particles of the metal in the liquid oxidizer, the hollow particles of said metal having a specific gravity approximately equal to the specific gravity of the liquid oxidizer; such that such suspension is stable and capable of withstanding the gravitational fields and acceleration forces to which the rocket engine system is subjected.

9. The improvement of claim 8 wherein the hollow metal particles are coated with an inert material capable of dissipating at the combustion temperature of the tripropellant system to release the metal particles to the combustion chamber.

10. The improvement of claim 8 wherein the metal is beryllium.

11. The improvement of claim 1 wherein the metal is aluminum.

12. The improvement of claim 1 wherein the total oxygen fed to the combustion chamber is approximately equal, stoichiometrically, to the amount of metal fed to the chamber, and wherein the amount of hydrogen fed to the combustion chamber is between about 20 and 32 per cent by weight of the total tripropellant fuel.

13. For use as a component of a multi-component jet engine propellant system comprising beryllium/oxygen/hydrogen, a stable slurry of a liquid oxidizer and finely divided beryllium particles, said particles of beryllium comprising hollow spheres which have a specific gravity approximately equal to the specific gravity of the liquid oxidizer such that the slurry is capable of retaining the beryllium particles in suspension under the high gravitational fields and acceleration forces to which the jet engine is subjected.

14. The slurry of claim 13 including a gellant for the liquid oxidizer.

15. The composition of matter of claim 13 wherein the beryllium particles are coated with a thin film of an inert material which is capable of being dissipated at the combustion temperature of the fuel to release the metal particles.

16. The composition of claim 13 wherein the liquid oxidizer is a member selected from the group consisting of liquid oxygen, nitrogen tetroxide, hydrogen peroxide, and mixtures thereof.

17. The method of claim 8 wherein the liquid oxidizer is a member selected from the group consisting of liquid oxygen, nitrogen tetroxide, hydrogen peroxide and mixtures thereof.

* * * * *